3,124,742
APPARATUS FOR INVESTIGATING EARTH FORMATIONS HAVING AN ELECTRODE SYSTEM AND COIL SYSTEM ON THE SAME SUPPORT MEMBER
William P. Schneider, Houston, Tex., assignor to Schlumberger Well Surveying Corporation, Houston, Tex., a corporation of Texas
Filed June 23, 1958, Ser. No. 743,604
29 Claims. (Cl. 324—1)

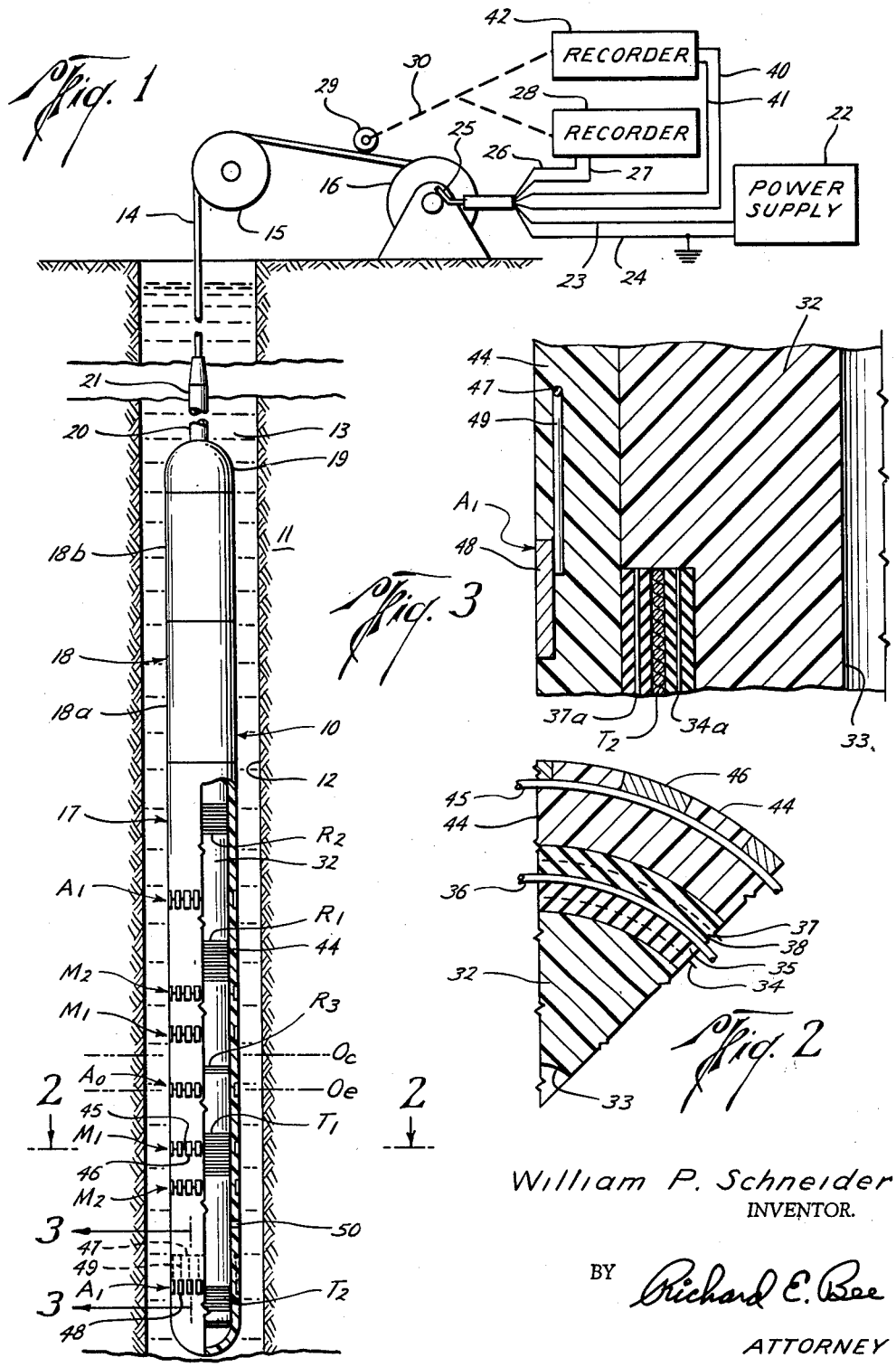

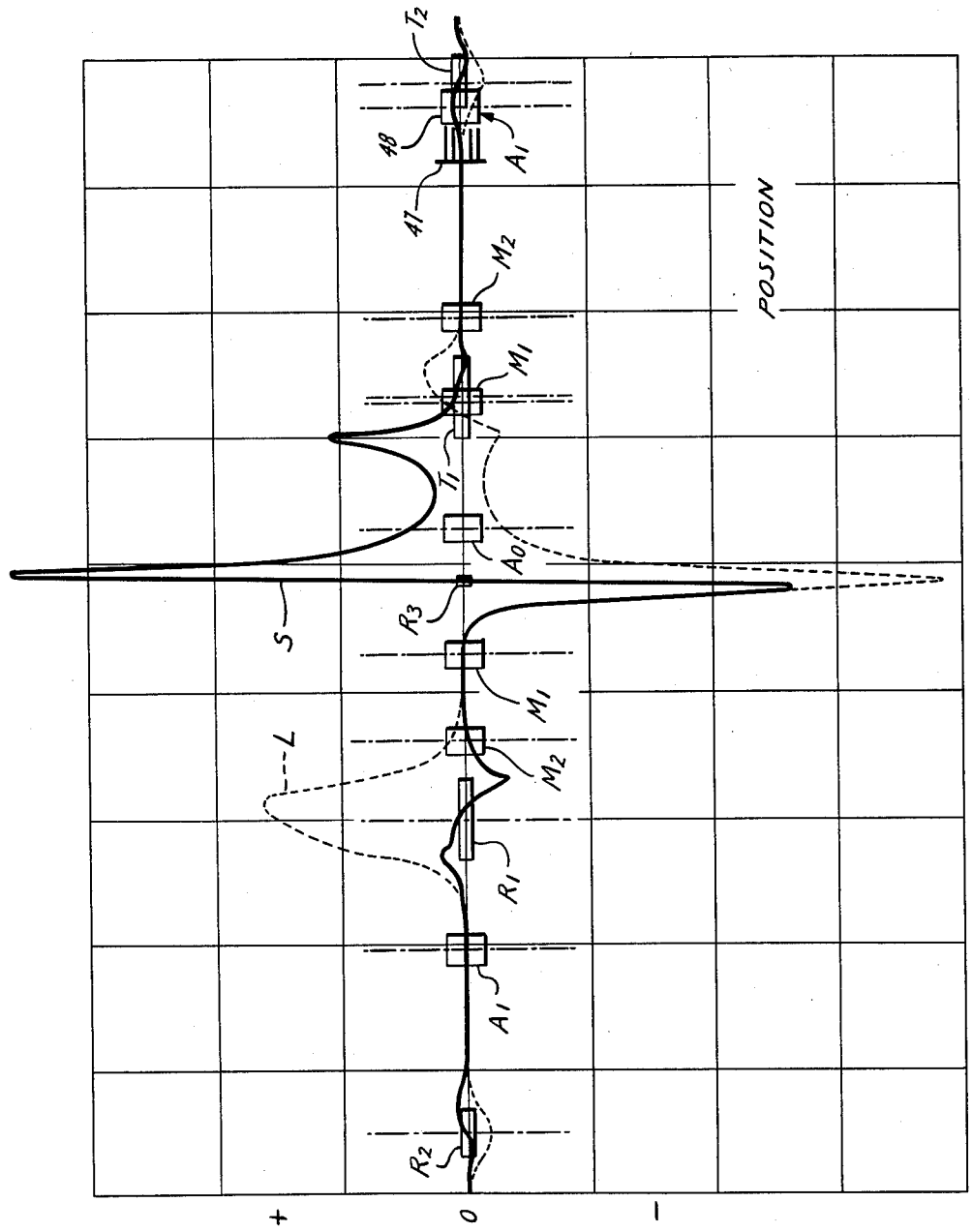

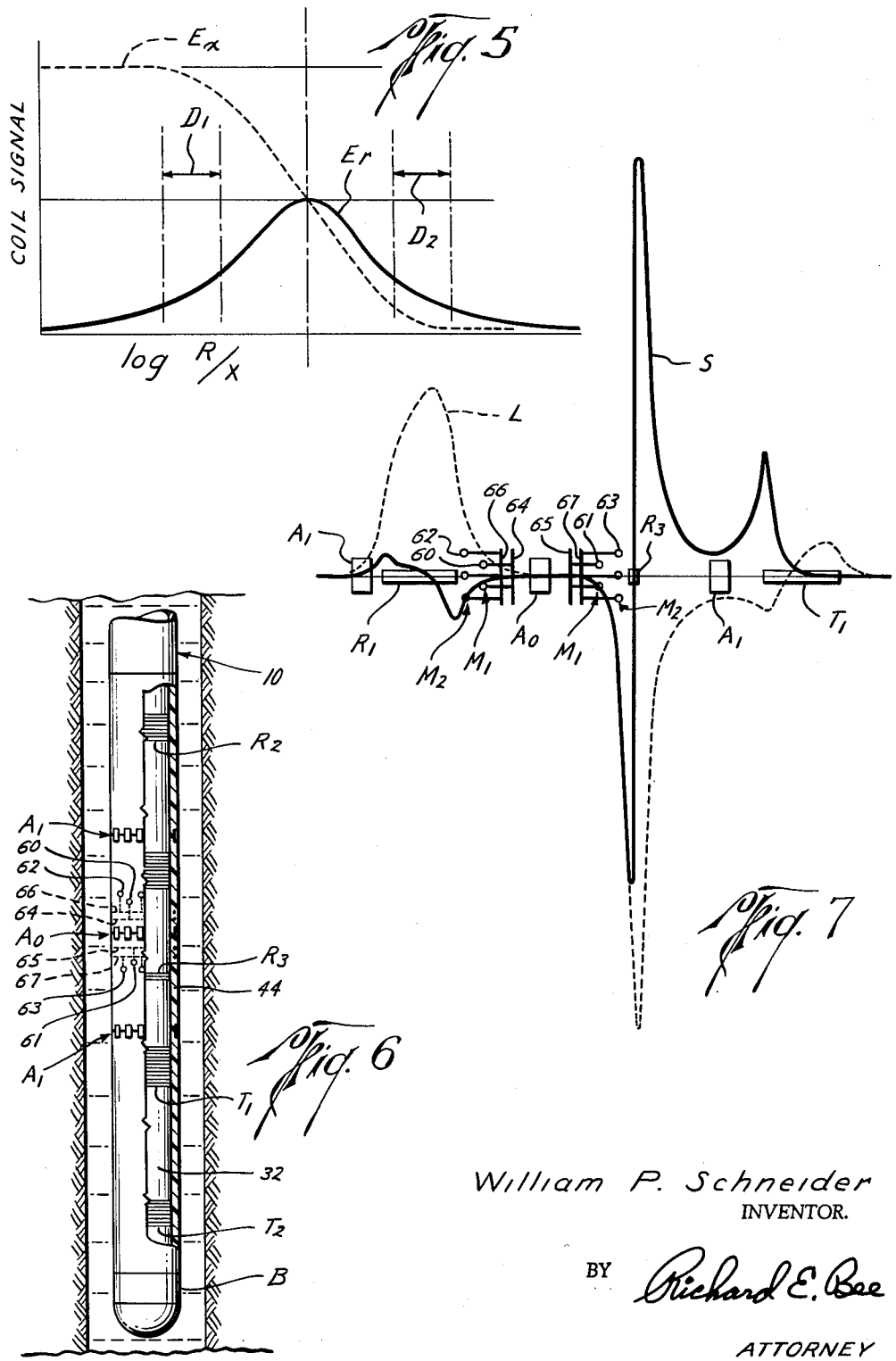

This invention relates to electrical apparatus for investigating subsurface earth formations traversed by a borehole and, particularly, to two types of such apparatus, namely, electrode systems for emitting current directly into the earth formations adjacent a borehole and coil systems for electro-magnetically inducing current flow in the formations.

It has become accepted practice to obtain logs or records of the electrical resistivity or conductivity of subsurface earth formations traversed by a well or borehole by utilizing various types of electrode systems and coil systems which are lowered into the borehole. It is frequently desirable to obtain both electrode system and coil system logs in one and the same borehole. In order to reduce the time and expense required to obtain the logs, it is desirable to obtain both logs on the same trip through the borehole. Also, in order to minimize problems involved in correlating the borehole depth scales for the two logs, it is desirable that the electrode and coil systems be mounted in close proximity to one another with their borehole depth reference points at approximately the same level relative to the surface of the earth.

If electrodes are mounted in close proximity to a coil system, however, considerable difficulty is encountered because the presence of conductive electrodes close to a coil system tend to upset the operation of the coil system. This is because the coil system will induce eddy current flow in the electrodes which, in turn, will induce false indications or signals back into the coil system. Such indications or signals are false in the sense that they are determined by the electrode impedance and not by the earth formation impedance. In this regard, it must be remembered that the desired coil system signals from the earth formation are generally small in magnitude. As a result, the coil system is very sensitive to the presence of conductive material, in this case, conductive electrodes, in close proximity therewith.

Because of the foregoing difficulty, combined electrode and coil system apparatus heretofore utilized has included only a very simple type of electrode system having a very few electrodes of very small size and surface area. It is, however, frequently desirable to use a more complex type of electrode system having several electrodes, some of which should have an appreciable surface area for optimum operation of the electrode system. This is particularly true in the case of multielectrode focusing type systems. Also, even in the case of simple electrode systems, it would frequently be desirable to increase the dimensions of the electrodes if this could be done without upsetting the operation of the coil system.

It is an object of the invention, therefore, to provide new and improved well logging apparatus which enables both electrode system and coil system measurements to be obtained on the same trip through the well.

It is another object of the invention to provide new and improved well logging apparatus wherein a relatively complex multielectrode system is placed in close proximity to a coil system without introducing any appreciable adverse effects into the operation of the coil system.

It is a further object of the invention to provide new and improved well logging apparatus wherein a relatively complex multielectrode system is placed on the same support member with a coil system with a minimum of separation of their borehole depth reference points.

It is an additional object of the invention to provide a new and improved electrode structure for use in close proximity to a borehole coil system.

In accordance with the invention, apparatus for investigating earth formations traversed by a borehole comprises support means adapted to be moved through the borehole and a coil system secured to the support means. The apparatus further includes an electrode system secured to the support means and encircling the coil system, as least one of the electrodes individually comprising a closed loop formed by a conductor of relatively small cross-sectional area and a plurality of conductive elements having relatively large surface areas electrically connected to such loop.

For a better understanding of the present invention, together with other and further objects thereof, reference is had to the following description taken in connection with the accompanying drawings, the scope of the invention being pointed out in the appended claims.

Referring to the drawings:

FIG. 1 is an elevational view of a representative embodiment of well logging apparatus constructed in accordance with the present invention with a portion of the apparatus exterior cut away to reveal the inner construction thereof;

FIG. 2 is a part of a horizontal cross section taken along the section line 2—2 of FIG. 1;

FIG. 3 is a vertical cross section of a portion of the FIG. 1 apparatus taken along the section line 3—3;

FIG. 4 is a graph showing the effect of placing various types of electrode elements in proximity to the coil system of FIG. 1;

FIG. 5 is a graph used in explaining the operation of the FIG. 1 apparatus;

FIG. 6 is an elevational view of another embodiment of well logging apparatus constructed in accordance with the present invention; and FIG. 7 is a graph similar to FIG. 4 and is used in explaining the operation of the FIG. 6 apparatus.

Referring to FIG. 1 of the drawings, there is shown a representative embodiment of apparatus 10 for investigating earth formations 11 traversed by a borehole 12. The borehole 12 is filled with a conductive fluid 13, commonly referred to as "drilling mud." The apparatus 10 is attached to an armored multi-conductor cable 14 which passes over a pulley or sheave 15 at the surface of the earth and is then secured to a winch 16. In this manner, the apparatus 10 may be raised and lowered in the borehole 12 by the winch 16.

The apparatus 10 includes a lower portion 17 forming a support means for coil and electrode elements and an upper portion 18 which comprises a fluid tight electronic cartridge or housing. The exterior of the electronic cartridge 18 is either formed of or covered with electrical insulation material. The apparatus 10 further includes a head portion 19 for connecting the electronic cartridge 18 to the cable 14, the exterior of this head portion either being formed of or covered with electrical insulation material during the operation of the apparatus. The first 100 feet or so of the cable 14 that is located immediately above the head portion 19 of the apparatus 10 is surrounded and enclosed by a boot 20 of electrical insulation material such as rubber. A downhole ground electrode 21 may be secured to the boot 20 near the upper end thereof, this ground or current-return electrode being far enough above any electrodes on the support means 17 so as to be electrically remote therefrom.

In order to electromagnetically induce current flow in the adjacent earth formations and obtain a measure of such current flow, the apparatus 10 includes a coil system secured to the support means 17. This coil system includes transmitter coils $T_1$ and $T_2$ and receiver coils $R_1$, $R_2$, and $R_3$. These coils constitute a focusing-type coil system of the kind described in United States Patent 2,582,314 of H. G. Doll, granted January 15, 1952, and hence are constructed in accordance with the teachings of such patent. It is to be understood that the particular coil system shown in FIG. 1 is intended as a representative example only because other coil systems having different numbers and types of coils may instead be used with the present invention. For example, the present invention may instead be used with a monocoil system having only a single coil associated therewith.

In order to energize the transmitter coils $T_1$ and $T_2$ and to process the signals received by the receiver coils $R_1$, $R_2$, and $R_3$, there is included within a lower portion 18a of the electronic cartridge 18 suitable electronic circuits for this purpose. These circuits include suitable phase-sensitive circuits for distinguishing between the resistive and reactive components of the earth formation currrent flow and, as such, may be constructed in accordance with teachings of United States Patent 2,788,483 of H. G. Doll for "Phase Rejection Networks," granted April 9, 1957. These circuits may be constructed to operate with a transmitter coil energizing current having a frequency of, for example, 20 kilocycles per second. Where the phase rejection circuits of this patent are utilized, the output stage of such circuits may also include a phase-sensitive detector circuit which, in addition to further distinguishing between resistive and reactive components, also serves to convert the 20 kilocycle receiver coil signal to a direct-current signal for transmission up the cable 14.

Electrical power for operating the coil circuits in the cartridge portion 18a is supplied thereto by a power supply 22 at the surface of the earth which is connected thereto by way of conductors 23 and 24, a pair of a plurality of brush-type commutators 25 associated with the winch 16, and a pair of the insulated conductors in the cable 14. The electrical power may be, for example, in the form of an alternating current having a frequency of 60 cycles per second. The output signal developed by the downhole coil circuits, on the other hand, is transmitted by an additional pair of conductors in the cable 14, an additional pair of the brush-type commutators 25, and a pair of conductors 26 and 27 to a suitable recording device or recorder 28 at the surface of the earth for making a permanent record of such signals.

A mechanical drive wheel 29 engages the cable 14 for mechanically driving the recorder 28, as indicated by dash line 30, for advancing the paper or film or other medium on which the records are being made in synchronism with the movement of the downhole apparatus 10 through the borehole 12. For the present embodiment, it shall be assumed that the coil circuits 18a are constructed to provide an output signal representative of the resistive component of the earth formation current flow. In this case, then, the recorder 28 serves to provide a continuous record of the formation conductivities along the entire length of the borehole 12.

Considering the construction of the coil system in greater detail, the lower portion of the apparatus 10 constituting the support means 17 includes an elongated inner mandrel portion 32. This mandrel 32 is formed of non-conductive, nonmagnetic material such as a plastic impregnated fiberglass. Secured to the mandrel portion 32 of the support means 17 is the previously-mentioned coil system represented by transmitter coils $T_1$ and $T_2$ and receiver coils $R_1$, $R_2$, and $R_3$. Each of these coils is formed, for example, of a single layer of wire conductor wrapped around the mandrel 32 and lying in a recessed portion thereof, these coils being longitudinally spaced apart from one another along the mandrel 32. The transmitter coils $T_1$ and $T_2$ are electrically interconnected in a series opposing manner and the group as a whole is electrically connected to appropriate electrical circuit means contained in the lower portion 18a of the electronic cartridge 18 by means of suitable wire conductors. These wire conductors are not shown in FIG. 1 but may be embedded in suitable longitudinal recesses machined in the mandrel 32 or may lie in a central passage provided in the center of the mandrel 32 or both. Similarly, receiver coils $R_1$, $R_2$ and $R_3$ are electrically interconnected with coil $R_1$ having a polarity opposite to that of coils $R_2$ and $R_3$ and the group as a whole is electrically connected to appropriate electrical circuits in the lower portion 18a of cartridge 18 by means of suitable wire conductors not shown in FIG. 1.

Referring now to FIG. 2 of the drawings, there is shown a part of a horizontal cross section of the apparatus 10 taken along the section line 2—2 of FIG. 1, which shows the construction of transmitter coil $T_1$ in greater detail. Progressing from the center out, FIG. 2 shows the mandrel 32 with a longitudinal central passage 33 therein. An inner electrostatic shield 34 is embedded in insulation material 35, which may be rubber, and both shield 34 and insulation 35 surround the mandrel 32. Surrounding the insulation material 35 is a wire turn 36 of the transmitter coil $T_1$. This, in turn, is surrounded by an outer electrostatic shield 37 embedded in suitable insulation material 38, such as rubber. The coil $T_1$, electrostatic shields 34 and 37, and the layers of insulation material 35 and 38 are located in a recessed portion of the mandrel 32, which recessed portion is longitudinally coextensive with the coil $T_1$. Similar forms of construction are provided for the other coils $T_2$, $R_1$, $R_2$, and $R_3$.

The electrostatic shields 34 and 37 each comprise a plurality of narrow longitudinally-extending conductive strips or wires spaced apart around a circumference concentric with the longitudinal axis of the mandrel 32. The strips are electrically connected together at one end in a careful manner so as not to form any closed loops and the entire group is, in turn, electrically connected to both the downhole ground electrode 21 and a surface ground point, for example, by way of the surface-grounded power supply conductor 24. The electrostatic shields 34 and 37 form electrostatic barriers for minimizing the introduction of erroneous signals in the coil system due to capacitance variations in the borehole.

In order to emit current directly into the adjacent earth formations and obtain a measure of such current flow, the apparatus 10 also includes an electrode system secured to the support means 17. This electrode system includes a central survey current emitting electrode $A_0$, corresponding upper and lower monitoring electrodes $M_1$ and $M_2$, and corresponding upper and lower auxiliary current emitting electrodes $A_1$. These electrodes constitute a complex multielectrode focusing-type electrode system of the kind described in United States Patent 2,712,627 of H. G. Doll, granted July 5, 1955. As for the coil system, the particular type of electrode system shown in FIG. 1 is intended as a representative example only.

In order to energize the $A_0$ and $A_1$ current emitting electrodes and to monitor and utilize the signals received by the $M_1$ and $M_2$ monitoring electrodes, there is included within an upper portion 18b of the electronic cartridge 18 suitable electronic circuits for this purpose. The circuits may be constructed in accordance with the teachings of United States Patent 2,803,796 of N. A. Schuster, granted August 20, 1957, and as such may be adapted to provide an output signal which is representative of the conductivity of the adjacent earth formations. The circuits are constructed so that the current emitting electrodes $A_0$ and $A_1$ emit currents at a frequency substantially different from the coil system operating frequency. To this end, these electrodes may emit currents having a frequency of 400 cycles per second.

The resulting conductivity-representative output signal of the electrode system is transmitted up the cable 14 by way of an additional pair of cable conductors and then supplied by way of an additional pair of the commutators 25 and a pair of conductors 40 and 41 to a recorder 42 which is also driven by the drive wheel 29 and mechanical linkage 30 to provide a continuous record of formation conductivity as a function of the depth of the apparatus 10 in the borehole 12. As before, suitable electrical power for operating the electrode circuits in cartridge portion 18b is supplied to such circuits by the surface power supply 22. A current-return and potential reference point for the electrode circuits is established by way of suitable conductor connections, not shown, to the downhole ground electrode 21 on the boot 20 of cable 14.

Considering the construction of the electrode system in greater detail, the mandrel 32 is surrounded and enclosed by an elongated sleeve member 44 which is also constructed of nonconductive, nonmagnetic material such as plastic-impregnated Fiberglas. Secured to the outer surface of sleeve 44 is the electrode system represented by the longitudinally spaced apart electrodes $A_0$, $M_1$, $M_2$ and $A_1$. Each of these electrodes individually includes a closed loop formed by a conductor of relatively small cross-sectional area and a plurality of conductive elements having relatively large surface areas electrically connected to the loop. For the case of the lower electrode $M_1$, for example, the closed loop is formed by a small diameter wire 45, while the conductive elements are in the form of conductive plates 46 of relatively small thickness and relatively extended surface areas. As may be better seen in the cross-sectional view of FIG. 2, conductive elements 46 are inlaid in the exterior surface of the sleeve 44 with their outer faces exposed to the drilling mud 13 contained in the borehole 12. The conductive elements 46 are spaced apart around the periphery of the sleeve 44 to form a discontinuous conductive ring or discontinuous electrode encircling the longitudinal axis of the support means 17.

The closed loop conductor wire 45 is shown as being embedded in the sleeve 44 concentric with the conductive elements 46 and electrically connected to each of such elements 46. In this manner, the closed loop conductor 45 may be electrically insulated from the borehole drilling mud 13. In this particular case, however, where the closed loop conductor 45 lies directly underneath the conductive elements 46, it is not essential that it be insulated from the drilling mud 13 because it will not change the electrode region from which current is emitted. It is also apparent that the closed loop need not be formed by one continuous piece of wire but instead may be formed by separate conductor segments interconnecting adjacent ones of the conductive elements.

Another form of electrode constructed in accordance with the present invention is illustrated by the case of the lower $A_1$ electrode. The construction of this electrode may be seen in detail in the cross-sectional view of FIG. 3. Here a closed loop conductor 47 is longitudinally offset from its plurality of conductive elements 48. In this case, a plurality of insulated conductors 49 having relatively small cross-sectional areas are individually electrically connected to different ones of the conductive elements 48 and extend longitudinally along the support means or sleeve member 44 to the closed loop conductor 47 and are electrically connected thereto. For this case, it is more essential that the closed loop conductor 47 be electrically insulated from the drilling mud 13, otherwise current will be emitted therefrom, thus effectively extending the longitudinal dimension of the electrode. Such insulation may be provided by embedding the closed loop conductor 47 in the sleeve 44 as shown. Similarly, the longitudinally-extending conductors 49 may be insulated by embedding them in the sleeve 44.

Each of the electrodes $A_0$, $M_1$, $M_2$ and $A_1$ is electrically connected to appropriate circuit means contained in the upper portion 18b of the electronic cartridge 18 by means of suitable conductor wires extending longitudinally up the sleeve 44. These conductor wires are not shown in FIG. 1 but are electrically connected to the closed loop conductors and are located in suitable longitudinal recesses machined in the sleeve 44, the recesses being filled in with insulating material after the conductors are in place.

In order to prevent any pressure differentials from occurring between the interior and the exterior of sleeve 44 because of the presence of borehole fluid which may have seeped in between the mandrel 32 and the sleeve 44, which pressure differentials might become sufficient to rupture the sleeve as the borehole pressure decreases as the apparatus is raised in the borehole, one or more pressure relief or pressure equalizing ports, such as port 50, are provided in the sleeve 44.

If desired, the two surface recorders 28 and 42 may be combined into a single unit for providing a dual trace on a single piece of film. Instead of or in addition to supplying the downhole signals directly to the recorder units 28 and 42, such signals may first be supplied to suitable circuit means for processing them to obtain one or more modified signals, which modified signals are then supplied to the recorders 28 and 42 or to other and further recorders. For example, a ratio circuit or device may be used to form a modified signal corresponding to the ratio of the electrode and coil system signals, such ratio signal being indicative of formation anisotropy.

Considering now in detail what occurs when the electrode and coil systems are placed in close proximity to one another as, for example, by mounting them on the same support member as shown in FIG. 1, the physical presence of the coils does not affect the operation of the electrode system because the electrodes are electrically insulated from the interior region of the support means 17 and, hence, are free to emit currents and measure potentials in the usual manner. As mentioned, the systems are operated at two different frequencies and, hence, there is no problem of signal interference. The physical presence of the electrodes in close proximity to the coils, however, does affect the operation of the coil system. This is because this or, for that matter, any other type of borehole logging coil system is very sensitive to the presence of conductive material such as electrodes. This arises because the coil system will induce eddy current flow in such electrodes, which eddy current flow, in turn, induces undesired or erroneous indications back into the coil system. The seriousness of the problem is substantial in nature because the desired coil system output signal due to formation current flow is generally relatively small and frequently of the same order of magnitude as the erroneous signal due to the eddy current flow in the electrodes.

From general considerations, two things will at once become apparent. First, the coil system will be most sensitive to closed conductive paths which are concentric with the coil axis. For the FIG. 1 apparatus this means closed conductive paths concentric with the longitudinal axis of the support means 17. Thus, the use of such closed paths should apparently be avoided. Secondly, the surface area dimensions of the individual electrodes, especially in a circumferential direction, should be kept very small. Considerations of this sort were followed in the construction of the electrostatic shields 34 and 37 mentioned in connection with FIG. 2.

For electrode systems, however, it will in many cases be found that these conditions are in direct conflict with the sizes and shapes of electrodes required for satisfactory operation of the electrode system. This is particularly true in the case of focusing-type electrode systems where the current-emitting electrodes, in particular, must have a relatively appreciable amount of surface area in order to properly emit the requisite amounts of current.

In accordance with the present invention, a solution to this problem is provided by utilizing a novel form of electrode construction. This novel form of electrode construction is predicated upon the realization that the use of closed conductive paths in close proximity to the coils may not, in fact, be wholly detrimental. In fact, it has been discovered that when such closed conductive paths are combined with other forms of electrode elements, such as discrete conductive surfaces located parallel to the coil axis, opposing effects are produced which cancel one another. This would arise from the different eddy current flow patterns in the different types of elements.

In order to verify this theory, a series of tests were performed, the results of which are depicted in graphical form in FIG. 4. The data for the FIG. 4 graph was obtained by using a coil system of the type shown in FIG. 1, the apparatus being located away from any substantial conductive bodies. A nonconductive, nonmagnetic sleeve similar to the sleeve 44 shown in FIG. 1 but with the important difference that it contained no electrodes and no embedded conductors was placed over the coil mandrel in a manner similar to that shown in FIG. 1. Elemental electrode forms were then moved along the surface of the sleeve from one end to the other and the resulting resistive component of the output signal of the coil system was observed. Previous to this, the coil system had been adjusted for zero output in the absence of any electrode elements.

In the FIG. 4 graph, the abscissa axis corresponds to various longitudinal positions along the sleeve for a given elemental electrode, while the ordinate axis corresponds to various values of the resistive component of the coil system output signal. The positions of the various coils $T_1$, $T_2$, $R_1$, $R_2$ and $R_3$ of the coil system are indicated in outline form along the abscissa axis of the FIG. 4 graph.

The coil system response to a set of small electrically-disconnected conductive plates corresponding to the conductive elements 46 of the lower $M_1$ electrode of FIG. 1, which appears on the right hand side in FIG. 4, is indicated by the solid line curve S of FIG. 4. The conductive plates were arranged to form a discontinuous ring encircling the sleeve 44. In this case, no closed loop conductors were present. The data for curve S was obtained by moving the group as a whole from one end of the sleeve 44 to the other. For convenience, the response for this type of elemental electrode will be referred to as the "surface response."

Note carefully that the output signals used in plotting the FIG. 4 graph are the false or erroneous signals introduced into the coil system as a result of the eddy currents induced in the electrodes. These eddy currents have a polarity or direction of flow which depends on the position of the electrode elements relative to the transmitter coils $T_1$ and $T_2$, which coils produce flux fields of opposite polarity. Similarly, the amplitude of these eddy currents depends on the relative positioning of the electrode elements. Assuming a given eddy current amplitude and polarity, then the amplitude and polarity of the net error signal introduced into the receiver coils will depend on the position of the electrode elements relative to the receiver coils and especially on the area-turns product and winding polarity of the receiver coil located most closely to the conductive elements. Thus, for some positions of the conductive elements the net effect on the receiver coils is negative, while for other positions the net effect is positive. Also, in some regions the net effect may be substantially zero, that is, substantially zero error signal output will occur. These regions are clearly depicted in the FIG. 4 graph. From FIG. 4 it will be seen that the most sensitive coil system electromagnetic field region for extended-surface conductive elements such as the conductive plates being discussed lies near the center of the coil system in the region adjacent and intermediate the principal transmitter and receiver coils $T_1$ and $R_1$.

In order to understand how different shapes of extended-surface conductive elements will affect the surface response curve S of FIG. 4, it will be worthwhile to consider the effect thereon of changing the number and dimensions of the electrode elements. For a given coil system operating at a given frequency with a given value of current flowing through the transmitter coils, the shape of the surface response curve for a single conductive element will be dependent on the conductivity, thickness, surface shape and area and relative location of the conductive element. Where a plurality of different conductive elements are to be used, the net response curve may be obtained by properly superimposing the individual response curves and algebraically adding their ordinate values. Where the longitudinal midpoints of the elements are located at one and the same point along the sleeve, then the individual response curves may be directly superimposed. On the other hand, where the longitudinal midpoints are located at different positions along the sleeve, then the individual response curves must be shifted by an amount equal to the separation in longitudinal midpoints before the ordinate values are algebraically added.

For the case of the conductive elements 46 of the lower $M_1$ electrode, where the dimensions and conductivities of the individual elements are the same and where the longitudinal midpoints are located at the same position along the sleeve, the total response may be obtained by multiplying the response for a single element by the number of elements encircling the sleeve. Thus, adding or removing electrode elements serves to increase or decrease the magnitude of the surface response curve S but does not otherwise greatly affect the shape of such response curve.

Assuming the case of a single extended-surface conductive element, then increasing the circumferential dimension of the element will tend to have the same effect on the response curve as increasing the number of elements encircling the sleeve. In this case, however, it is important to note that the response for an element having a given circumferential dimension is not the same as the response for two separate elements each of one-half the circumferential dimension of the single element. In other words, for the case where it is desired to obtain a correct quantitative answer, the technique of obtaining a composite response curve by algebraically adding individual response curves is only applicable where the elements essentially retain their separate indentity.

Considering now the effects of varying the longitudinal dimensions of extended-surface conductive elements, consider first the case of two separate elements placed one after the other in a longitudinal direction parallel to the axis of the sleeve. In this case, the composite response curve may be obtained by shifting one of the elemental response curves by an amount equal to the separation of the longitudinal midpoints of the elements and then algebraically adding the ordinate values of the two elemental response curves. The effect on the response curve of doing this is to spread apart the abscissa values of the curve and reduce the peaks of the ordinate values. If, instead of using two separate elements, the longitudinal dimension of a single element is increased the same effect would be noted through it will not be quantitatively equal to the effect obtained with separate elements having the same total area. This technique of increasing the longitudinal dimension may, in some cases, be advantageously utilized to lower the peak fluctuations in the element response, especially where an element must be located at a critical position relative to the coil system.

Considering now the response of the coil system to an elemental closed loop conductor, the resistive component of such coil system response is indicated by dash-line curve L of FIG. 4. Such response will be referred to as the "loop response" of the coil system. In determining this response curve, no extended-surface conductive elements were present and only a single closed loop of relatively small diameter wire was used. As is seen from curve L, the system response is positive in some regions, negative in other regions and substantially zero in still further regions. The amplitude or ordinate value of this response curve is dependent on both the conductivity and diameter of the wire used. As before, the composite response for more than one closed loop conductor may be obtained by properly superimposing elemental response curves for individual loops and algebraically adding their ordinate values.

As is seen from FIG. 4, even a relatively small diameter wire produces a response of the same order of magnitude as the response for a set of extended-surface type conductive elements. Accordingly, the coil system is very sensitive to the presence of such closed loop conductors and hence, in general, the number and longitudinal dimensions of such conductors should both be small in order to keep loop response error signals within reasonable bounds. Accordingly, for the embodiments presently set forth only a single such closed loop conductor is utilized for each of the electrodes, though in some cases more than one may be used provided it is done with care.

The response curve L of FIG. 4 was taken for the case where the plane of the elemental closed loop conductor was perpendicular to the longitudinal axis of the sleeve. In some cases, however, it may be desirable to tilt the plane of the closed loop conductor so that it is at an angle relative to the perpendicular. The effect of this is to spread apart the abscissa values of the response curve and reduce the peak magnitudes of the ordinate values. Such technique may sometimes be utilized to advantage, particularly in sensitive coil system regions.

The surface response curve S of FIG. 4 was obtained for a set of conductive elements corresponding to the elements 46 for the lower $M_1$ electrode. If the conductive elements for the other electrodes have the same conductivity and dimensions and are the same in number, then this same response curve S will be applicable to such other electrodes and may be used to determine the total coil system response for all of the electrodes. In the case of the FIG. 1 apparatus, the $A_0$, $M_1$ and $M_2$ electrodes are of identical construction so that this situation applies. In the case of the $A_1$ electrodes, however, such electrodes are identical to the other electrodes except that the conductive elements have slightly greater longitudinal dimensions. As a result, curve S is only approximately correct for the $A_1$ conductive elements. Nevertheless, it is sufficiently accurate to give a fair picture of the effect these electrodes will have on the total system response.

Similarly, the loop response curve L will apply to the different electrode loop conductors only where such loops have the same conductivities and wire diameters. As before, curve L was taken for the closed loop conductor 45 of the lower $M_1$ electrode and is equally applicable to the $A_0$, the upper $M_1$ and both $M_2$ closed loop conductors, which are identical to such lower $M_1$ conductor. The $A_1$ closed loop conductors, however, were made of somewhat greater diameter wire having a higher value of conductivity. Accordingly, curve L is only approximately correct for such $A_1$ closed loop conductors. The reason the $A_1$ electrodes differ from the other electrodes is that they were constructed to have substantially lower resistances in order to facilitate the emission of the larger currents required to be emitted therefrom.

It is seen from the FIG. 4 graph that is certain regions the surface response of curve S is opposite in polarity to the loop response of curve L. This is particularly the case in the critical region between the transmitter coil $T_1$ and the receiver coil $R_3$. In constructing the electrode system, then, the desired objective is to position the electrodes so that the net error signal response introduced into the coil system is a minimum. To this end, it is possible to position an electrode so that the surface response will cancel the loop response. In the FIG. 1 embodiment, this is done in the case of the $A_0$ electrode. Similarly, partial cancellation of the loop and surface responses is obtained in the case of the upper $M_2$ electrode. Some of the electrodes, on the other hand, such as the upper $A_1$ and $M_1$ electrodes and the lower $M_2$ electrodes are positioned in regions of substantially zero response, while the lower $M_1$ electrode is in a region of predominantly one polarity of response. To obtain zero net effect on the coil system, the electrodes are positioned so that the total negative error signal is offset by the total positive error signal. In achieving this result, use may be frequently made of the technique illustrated in the case of the lower $A_1$ electrode, namely, the technique of offsetting the closed loop conductor 47 from the conductive elements 48 so as to obtain the desired total cancellation.

In some cases, instead of having the electrode system introduce substantially zero error into the coil system, it may be desirable to construct the electrode system to deliberately introduce a desired amount of error of a particular polarity, which error may be used to cancel a residual error otherwise occurring in the coil system itself.

Up to this point only the response of the coil system to the resistive component of the electrode impedance has been considered, this component being in phase with the current flowing in the transmitter coils. The reactive component of the electrode impedance, however, also serves to introduce a quadrature-phased component into the receiver coils. The magnitude of the reactive signal component resulting across the receiver coils relative to the resistive signal component will depend on the ratio of electrode resistance to electrode.

The relationship between these two components for a given electrode element in a given location is illustrated by the graph of FIG. 5. The abscissa axis of the FIG. 5 graph is plotted in terms of logarithmic values of the ratio of R to X, where R denotes the resistive component and X the reactive component of the electrode impedance. The ordinate axis is plotted in terms of signal amplitudes appearing across the receiver coils $R_1$, $R_2$ and $R_3$. The curves of FIG. 5 are obtained by holding constant the reactive component X and varying the value of the resistive coponent R for a given electrode element. The resistive component of the receiver coil error signal as a function of $R/X$ is indicated by curve $E_r$, while the reactive component is indicated by dash-line curve $E_x$. If the value of the reactive component is varied, then the amplitude of both the $E_r$ and $E_x$ curves will vary but by the same factor, hence leaving the amplitude of one curve relative to the other curve unaltered. For simplicity, the reactive component X is assumed to have a given constant value or, in other words, the absolute ordinate values for the FIG. 5 curves are for a given value of X.

The physical meaning of the curves of FIG. 5 is that for small values of R relative to X the receiver coil error signal is principally a reactive signal, while for large values of R relative to X it is principally a resistive signal. Also, as R becomes very large, both resistive and reactive signal components decrease because of the reduced total magnitude of eddy current flow. Also, from FIG. 5, it is seen that the peak value for the $E_r$ curve occurs when R is equal in magnitude to X. Also, the peak value of the $E_x$ curve is equal to twice the peak value of the $E_r$ curve.

An important conclusion from the curves of FIG. 5 is that even though the resistive signal component introduced by a given element into the receiver coils is small, the reactive signal component may nevertheless be quite large. This occurs for values of R less than X. In fact, if care is not taken, the magnitude of the reactive signal components may exceed the value that can be safely handled by the phase discriminating circuits in the coil system. In general, therefore, it will be desirable to construct the electrodes, or at least the majority of them, so that the resistive component R will exceed the reactive component X. In this manner, the electrodes will be operated over a range such as the range $D_2$ of FIG. 5 where both resistive and reactive error signal components are small.

For closed loop conductors made of wire, the ratio of resistance to reactance at a given operating frequency may be varied by varying either the conductivity or the diameter of the wire. For the case of copper wire, which represents a fixed value of conductivity, it has been found for an operating frequency of 20 kc. that the peak value on the $E_r$ curve, corresponding to the case where the resistance is equal to the reactance, occurs for No. 25 gauge wire. Thus for larger wire gauge numbers, that is, wires having a smaller diameter than No. 25 wire, the closed loop conductor will operate in the desired region to the right of the peak of in the $E_r$ curve. Somewhat larger wire diameters may be utilized by using wire material having a higher resistivity than copper.

For the FIG. 1 embodiment, the closed loop conductors for the $A_0$, $M_1$ and $M_2$ electrodes were constructed of a small diameter resistance wire of an alloy of iron, nickel and chromium, commonly referred to a Nichrome. Use of this type of resistance wire insures operation in the $D_2$ region of FIG. 5. The closed loop conductors for the $A_1$ electrodes, on the other hand, were for reasons of ease of current emission constructed of No. 14 copper wire, which would operate over a region corresponding to $D_1$ on the FIG. 5 graph.

For closed loop conductors, the values of resistance and reactance may either be calculated mathematically from the size and conductivity parameters or else may be determined by conducting a series of tests in which only a single parameter is varied and the resulting resistive component of the coil system output signal plotted as a function of this parameter. In the latter case, the value of the parameter at which the peak in the coil system output signal occurs will indicate the critical value where R is equal to X.

Turning now to the case of extended-surface conductive elements, it has been found that the resistance of such elements is inversely proportional to both the conductivity and the thickness of the element. Thus, assuming the surface area dimensions of the elements are fixed by electrode system requirements, then either the conductivity or the thickness of such an element may be varied to obtain operation in the region where the resistance is substantially greater than the reactance. In this case, it is difficult to calculate the values of resistance and reactance mathematically and, hence, the critical values are more readily determined by observing the variations in the resistive component of the coil system output signal as either the conductivity or the thickness of the element is varied. For the FIG. 1 embodiment, the extended-surface conductive elements were constructed of Nichrome resistance material having a suitable thickness to insure operation over the upper $D_2$ range of FIG. 5.

It has just been seen how the reactive signal component introduced by each element, considered by itself, may be appropriately minimized. It should next be considered whether the reaction signal components introduced by one element or group of elements can be made to cancel the reactive components introduced by another element or group of elements in the same manner that the resistive components were made to cancel one another. In order to determine this, both loop and surface response curves similar to those shown in FIG. 4 were obtained for the net reactive signal induced across the receiver coils. These response curves were generally similar in shape to those obtained for the resistive signal components, except that they were generally of opposite polarity to the corresponding portions of the curves for the resistive components. Thus, it would indeed be possible to provide the same type of signal cancellation for the reactive components. Whether the signal cancellation should be provided primarily for the resistive components or primarily for the reactive components depends on whether formation resistance or formation reactance is the quantity which it is desired to measure. For the present example, formation conductivity, the reciprocal of formation resistivity and hence a resistive quantity, is the quantity being measured and, hence, it is the resistive error signal components which are given preferential treatment.

Whether or not the condition for minimum net resistive component also corresponds to the condition for minimum net reactive component depends on the resistance-reactance ratios of the various electrode elements. If all of the electrode elements have the same ratio of resistance to reactance, then the minimum condition for one case will correspond to the minimum condition for the other case. If, however, the resistance to reactance ratios are not all the same, then this result will not necessarily obtain. This is particularly true where the resistance-reactance ratios for some electrode elements lie on one side of the $E_r$ curve peak while others lie on the other side. In such cases, it will generally be better to construct a majority of the electrode elements so that in each case the resistance is substantially greater than the reactance thereby insuring a sufficiently small reactive signal across the receiver coils such that the phase discriminating circuits of the coil system will not be overloaded.

One other feature that should be noted in connection with FIG. 5 is that use may be made of the resistance characteristic indicated by the $E_r$ curve to increase the stability of the combined coil and electrode systems. Such increased stability may be obtained by operating some of the electrode elements in the lower $D_1$ region while operating other of the electrode elements in the upper $D_2$ region. In this case, any disturbance, such as a change in temperature, which tends to affect the resistance of all of the electrode elements in a similar manner will produce opposing changes in the net resistive error signal induced across the receiver coils. For example, if an increase in temperature should cause the element resistances to increase, then the elements operating in the lower $D_1$ region will introduce more resistive signal component while the elements operating in the upper $D_2$ region will introduce less resistive component, the result being a minimum of net change in the total resistive signal component. Where the apparatus was originally constructed to provide substantially zero resistive error signal, this means that the zero condition will suffer a minimum of disturbance.

In utilizing this type of stabilization, however, care must be taken that the reactive signal components do not exceed the amount that can be safely handled by the phase discriminating circuits of the coil system. The FIG. 1 embodiment enjoys some of the benefits of this stabilization feature in that the closed loop conductor for the $A_1$ electrodes operate in the lower $D_1$ region while the remainder of the electrode elements operate in the upper $D_2$ region.

Another important advantages that results from the use of the closed loop conductor plus extended-surface conductive element type of composite electrode is the increased stability that results where the electrode is operated in the presence of a conductive medium such as the drilling mud 13. Considering the lower $M_1$ electrode of FIG. 1, for example, then in the absence of the closed loop conductor 45 the surface conductive elements 46 would still be electrically interconnected to some degree by the drilling mud 13 when the apparatus is in the borehole. In other words, the conductive drilling mud would serve to close the loop by bridging the gaps between the exposed outer surfaces of the conductive elements 46. As a result, the operation of the coil system would suffer a change whenever the apparatus passed from a borehole region containing no drilling mud to a region that did contain such drilling mud. In particular, this would make it difficult to balance the coil system when the apparatus is suspended in air at the surface of the earth and then have this condition continue to exist as the apparatus is lowered into the borehole drilling mud. Also, even after the apparatus was lowered into the drilling mud, variations in the conductivity of the drilling mud would cause variations in the degree of electrical closure of the loop and, hence, correspond variations in the electrode error signal components introduced into the coil system, thus introducing a substantial source of instability or unreliability into the operation. Variations in the conductivity of the drilling mud would result from both variations in its chemical composition and variations with temperature and pressure.

The use of the closed loop conductor 45, however, overcomes this problem because such closed loop conductor 45 acts like a very low resistance shunt interconnecting the conductive elements 46 and, hence, any further bridging action by the relatively resistive drilling mud causes susbtantially no change in the electrode eddy current flow. In other words, the loop is always closed by a relatively low resistance conductor and, hence, any added closure afforded by the mud will be small in comparison thereto.

This may be more readily seen by comparing the resistivities for various electrode materials with the resistivity of the most conductive type of drilling mud likely to be encountered. Copper, for example, has a resistivity of 0.017 microhm-meter, while Nichrome has a resistivity of 1.08 microhm-meters. The most conductive type of drilling mud likely to be encountered, on the other hand, which is commonly referred to as a salty mud, will have a resistivity of 50,000 microhm-meters (0.05 ohm-meter). Thus, even where relatively high resistance wire such as Nichrome is used, the closed loop conductor will still look like a very low resistance shunt compared to even the most conductive type of drilling mud. Therefore, when the electrode system is constructed to introduce a minimum of net error into the coil system by use of closed loop conductors, it can also be relied on to maintain this minimum condition regardless of any variations in the drilling mud or in the nature of the medium surrounding the electrodes.

By constructing the electrode system in accordance with the foregoing teachings, the net error introduced into the coil system can be reduced to substantially zero and this condition can be maintained with a high degree of stability. As a result, even a complex electrode system may be placed in close proximity to a complex coil system by mounting the two systems on the same support member with the electrodes encircling the coils. In particular, the coil and electrode systems may be positioned so that their longitudinal midpoints, that is, their borehole depth reference points have a minimum of longitudinal separation. This is indicated in the FIG. 1 embodiment where the midpoint level or depth reference level of the coil system is indicated by reference line $O_c$, while the midpoint level of the electrode system is indicated by reference line $O_e$. As is thus apparent, the two systems will be measuring the formation conductivity at very nearly the same depth in the borehole, thus insuring accurate depth correlation of the two logs of formation conductivity provided by the surface recorders 28 and 42.

Referring now to FIG. 6 of the drawings, there is shown a modified form of electrode system which may be used with the coil system previously discused. In other words, the coil system of FIG. 6 is the same coil system already described for the FIG. 1 apparatus. The electrode system of FIG. 6 is again a focusing type system but differs from the system of FIG. 1 in that the electrodes are spaced more closely to one another and also there is included an electrically-proximate current return electrode B located on the lower end of the sleeve 44. The electrically-proximate current return electrode B is in the form of a continuous band of conductive material encircling the sleeve 44. The use of this electrically proximate or "pseudo ground" electrode B follows the general principles set forth in U.S. Patent 2,712,630 of H. G. Doll, granted July 5, 1955, and this together with the closer spacing of the $A_0$, $M_1$, $M_2$ and $A_1$ electrodes provides an electrode system from which the survey current has a smaller depth of lateral penetration into the formations as compared with the FIG. 1 electrode system.

Because the electrodes of the electrode system are more closely spaced and because it is again desired that the longitudinal midpoint or depth reference point of the electrode system have a minimum of longitudinal separation from the midpoint of the coil system, more of the electrodes will be located over the extremely sensitive central region of the coil system. This may be seen by referring to the graph of FIG. 7 which shows the central portion of the surface response curve S and the loop response curve L of FIG. 4 with the electrodes of the FIG. 6 system indicated in outline form along the abscissa axis.

In the FIG. 6 embodiment, the extended-surface conductive elements 60—63 of the $M_1$ and $M_2$ potential measuring electrodes are of circular instead of rectangular shape and are smaller in surface area. This serves to minimize the magnitude of the surface response due to these conductive elements while, at the same time it does not seriously affect the potential measuring, function of these electrodes in the electrode system. In the case of the $M_1$ and $M_2$ electrodes, the feature of offsetting the closed loop conductors from the extended-surface conductive elements is used to advantage. As seen in FIG. 7, it enables the closed loop conductors 64—67 to be moved away from the more sensitive areas of the loop response curve L. The lower $A_1$ current emitting electrode is positioned so that the loop and surface responses effectively cancel one another. As before, the various electrodes and electrode elements are positioned so that the total negative resistive error signal components will effectively cancel the total positive resistive error signal components, thereby producing a minimum of net resistive error signal at the output of the coil system. The electrically-proximate current return electrode B is positioned a sufficient distance from the lower transmitter coil $T_2$ so that it introduces substantially no error signal into the coil system.

While the foregoing types of electrode systems discussed in connection with the FIG. 1 and FIG. 6 embodiments represent relatively complex forms of electrode systems, it is readily apparent that the novel electrode structure of the present invention is also useful where simpler forms of electrode systems such as, for example, the two-electrode "normal" system described in U.S. Patent 1,894,328 of C. Schlumberger, granted January 17, 1933, are combined with coil systems. In such case, electrodes constructed in accordance with the present invention enable more uniform and symmetrical emission of current with greater ease and without disturbing the operation of the coil system.

From the foregoing descriptions of the various embodiments of the present invention, it is seen that electrical well loogging apparatus constructed in accordance therewith enables coil systems and electrode systems to be combined in close proximity to one another on the same support member and operated simultaneously with one another without upsetting or adversely effecting the operation of either system.

While there have been described what are at present considered to be preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In apparatus for investigating earth formations traversed by a borehole, the combination comprising: support means adapted to be moved through a borehole; a coil system secured to the support means for electromagnetic coupling with the earth formations; and an electrode system for emitting current into the earth formations secured to the support means and encircling the coil system, at least one of the electrodes individually comprising a closed loop formed by a conductor of relatively small cross-sectional area and a plurality of conductive elements having relatively large surface areas electrically connected to such loop.

2. In apparatus for investigating earth formations traversed by a borehole, the combination comprising: support means adapted to be moved through a borehole; a coil system secured to the support means for electromagnetic coupling with the earth formations; and an electrode system for emitting current into the earth formations secured to the support means and encircling the coil system, at least one of the electrodes individually comprising a closed loop formed by a conductor of relatively small cross-sectional area encircling the region occupied by the coil system and a plurality of conductive elements having relatively large surface areas electrically connected to such loop.

3. In apparatus for investigating earth formations traversed by a borehole, the combination comprising: nonconductive, nonmagnetic support means adapted to be moved through a borehole; a coil system secured to the support means for electromagnetic coupling with the earth formations; and an electrode system for emitting current into the earth formations secured to the support means and encircling the coil system, at least one of the electrodes individually comprising a closed loop formed by a conductor of relatively small cross-sectional area encircling the region occupied by the coil system and a plurality of conductive elements having relatively large surface areas electrically connected to such loop.

4. In apparatus for investigating earth formations traversed by a borehole, the combination comprising: elongated support means adapted to be moved through a borehole; a system of longitudinally spaced apart coils positioned in an interior region of the support means for electromagnetic coupling with the earth formations; and a system of longitudinally spaced apart electrodes secured to the support means and encircling the coil system for emitting current into the earth formations, the electrodes closely adjacent a coil individually comprising a closed loop formed by a conductor of relatively small cross-sectional area encircling the region occupied by the coil system and a plurality of conductive elements having relatively large surface areas electrically connected to such loop.

5. In apparatus for investigating earth formations traversed by a borehole, the combination comprising: elongated support means adapted to be moved through a borehole; a system of longitudinally spaced apart coils positioned in an interior region of the support means for electromagnetic coupling with the earth formations; and a system of longitudinally spaced apart electrodes secured to the support means and encircling the coil system for emitting current into the earth formations, the electrodes positioned in sensitive coil system electromagnetic field regions individually comprising a closed loop formed by a conductor of relatively small cross-sectional area encircling the region occupied by the coil system and a plurality of conductive elements having relatively large surface areas electrically connected to such loop with the parts of such electrodes positioned relative to the coils so that the electromagnetic coupling factors added to the coil system by the closed loops substantially cancel the coupling factors added by the conductive elements.

6. In apparatus for investigating earth formations traversed by a borehole, the combination comprising: elongated support means adapted to be moved through a borehole; a system of coils positioned in an interior region of the support means and spaced apart along and encircling the longitudinal axis thereof for electromagnetic coupling with the earth formations; and a system of electrodes secured to the support means for emitting current into the earth formations and individually comprising a closed loop formed by a conductor of relatively small cross-sectional area encircling the interior coil region and a plurality of conductive elements having relatively large surface areas electrically connected to such loop, these electrodes being spaced apart along the longitudinal axis of the support means with the longitudinal interval defined by the electrodes overlapping the longitudinal interval defined by the coils.

7. In apparatus for investigating earth formations traversed by a borehole, the combination comprising: elongated support means adapted to be moved through a borehole; a system of coils positioned in an interior region of the support means and spaced apart along and encircling the longitudinal axis thereof for electromagnetic coupling with the earth formations; and a system of electrodes secured to the support means for emitting current into the earth formations and individually comprising a closed loop formed by a conductor of relatively small cross-sectional area encircling the interior coil region and a plurality of conductive elements having relatively large surface areas electrically connected to such loop, these electrodes being spaced apart along the longitudinal axis of the support means with the longitudinal interval defined by the electrodes overlapping the longitudinal interval defined by the coils and with the separation between coil system and electrode system longitudinal midpoints being less than the separation between any pair of neighboring coils thereby to enable the depths of measure relative to the top of the borehole to be substantially the same for both systems.

8. In apparatus for investigating earth formations traversed by a borehole, the combination comprising: support means adapted to be moved through a borehole; a coil system secured to the support means for electromagnetic coupling with the earth formations; and an electrode system for emitting current into the earth formations secured to the support means and encircling the coil system, at least one of the electrodes individually comprising a plurality of spaced apart conductive elements having relatively large surface areas encircling the region occupied by the coil system to form a discontinuous ring and a closed loop formed by conductor segments of relatively small cross-sectional area electrically connecting such surface elements.

9. In apparatus for investigating earth formations traversed by a borehole, the combination comprising: elongated support means adapted to be moved through a borehole; a system of coils positioned in an interior region of the support means and spaced apart along and encircling the longitudinal axis thereof for electromagnetic coupling with the earth formations; and a system of electrodes for emitting current into the earth formations secured to the support means and individually comprising a plurality of spaced apart conductive elements having relatively large surface areas encircling the interior coil region to form a discontinuous ring and a closed loop formed by conductor segments of relatively small cross-sectional area encircling the interior coil region and electrically connecting such surface elements, the discontinuous ring portions of these electrodes being spaced apart along the longitudinal axis of the support means with the longitudinal interval defined by the electrodes overlapping the longitudinal interval defined by the coils.

10. Combined coil and electrode apparatus for investigating earth formations traversed by a borehole, the combination comprising: elongated support means constructed of nonconductive, nonmagnetic material and adapted to be moved through a borehole; a system of interconnected transmitter coils and interconnected receiver coils positioned in an interior region of the support means and spaced apart along and encircling the longitudinal axis thereof, at least one coil in each of the transmitter and receiver groups having a winding polarity opposite to that of the others; circuit means for energizing the transmitter coils and providing indications of the component of the net signal induced in the receiver coils which is in phase with the current supplied to the transmitter coils; a system of electrodes secured to the support means and individually comprising a plurality of spaced apart conductive elements having relatively large exposed surface areas encircling the interior coil region to form a discontinuous ring and a closed loop formed by conductor segments of relatively small cross-sectional area encircling the interior coil region and electrically connecting such surface elements, the discontinuous ring portions of these electrodes being spaced apart along the longitudinal axis of the support means with the longitudinal interval defined by the electrodes overlapping the longitudinal interval defined by the coils, the discontinuous ring and closed loop portions of these electrodes being positioned relative to the coils so that any error signal components having the same phase as the transmitter coil current resulting in the receiver coils due to the presence of the electrodes largely cancel one another to provide a minimum of net error signal; and circuit means coupled to the electrodes for operating them to provide indications of formation resistivity independently of the indications provided by the coil system.

11. In apparatus for investigating earth formations traversed by a borehole, the combination comprising: an elongated mandrel adapted to be moved through a borehole; a system of coils individually wrapped around the mandrel and spaced apart along the longitudinal axis thereof for electromagnetic coupling with the earth formations; an elongated nonconductive, nonmagnetic sleeve member surrounding the coils and secured to the mandrel; and an electrode system for emitting current into the earth formations secured to the outer surface of the sleeve member, at least one of the electrodes individually comprising a plurality of spaced apart conductive elements having relatively large exposed surface areas encircling the sleeve member to form a discontinuous ring and a closed loop formed by conductor segments of relatively small cross-sectional area imbedded under the surface of and concentric with the sleeve member and electrically connecting the exposed surface elements.

12. In apparatus for investigating earth formations traversed by a borehole, the combination comprising: support means adapted to be moved through a borehole; a coil system secured to the support means for electromagnetic coupling with the earth formations; circuit means for operating the coil system to provide indications of at least one of the resistive and reactive characteristics of the formation; an electrode system secured to the support means and encircling the coil system, at least one of the electrodes individually comprising a closed loop formed by a conductor of relatively small cross-sectional area and a plurality of conductive elements having relatively large surface areas electrically connected to such loop; and circuit means for operating the electrode system to provide indications of the resistive characteristics of the formation.

13. In apparatus for investigating earth formations traversed by a borehole, the combination comprising: support means adapted to be moved through a borehole; a coil system secured to the support means for electromagnetic coupling with the earth formations; circuit means for operating the coil system to provide indications of the resistive characteristics of the formation; an electrode system secured to the support means and encircling the coil system, the electrodes being positioned relative to the coil system so that erroneous resistive indications introduced in the coil system because of the near proximity of at least one of the electrodes is of one polarity while erroneous resistive indications introduced by at least another of the electrodes is of opposite polarity so as to at least partially cancel the first-mentioned erroneous indications thereby to minimize the total erroneous resistive indications; and circuit means for operating the electrode system to provide further indications of the resistive characteristics of the formation independently of those provided by the coil system.

14. In apparatus for investigating earth formations traversed by a borehole, the combination comprising: support means adapted to be moved through a borehole; a coil system secured to the support means for electromagnetic coupling with the earth formations; circuit means for operating the coil system to provide indications of the resistive characteristics of the formation; an electrode system secured to the support means and encircling the coil system, one of the electrodes individually comprising a closed loop formed by a conductor of relatively small cross-sectional area and a plurality of conductive elements having relatively large surface areas electrically connected to such loop with the closed loop and conductive element portions of this electrode positioned relative to the coil system so that erroneous resistive indications introduced in the coil system by the closed loop are at least partially cancelled by erroneous resistive indications introduced by the conductive elements; and circuit means for operating the electrode system to provide further indications of the resistive characteristics of the formation independently of those provided by the coil system.

15. In apparatus for investigating earth formations traversed by a borehole, the combination comprising: support means adapted to be moved through a borehole; a coil system secured to the support means for electromagnetic coupling with the earth formations; circuit means for operating the coil system at a first frequency to provide indications of at least one of the resistive and reactive characteristics of the formation; an electrode system secured to the support means and encircling the coil system, at least one of the electrodes individually comprising a closed loop formed by a conductor of relatively small cross-sectional area and a plurality of conductive elements having relatively large surface areas electrically connected to such loop; and circuit means for operating the electrode system at a second frequency to provide indications of the resistive characteristics of the formation independently of the indications provided by the coil system.

16. In apparatus for investigating earth formations traversed by a borehole, the combination comprising: support means adapted to be moved through a borehole; a coil system secured to the support means for electromagnetic coupling with the earth formations; circuit means for operating the coil system at a predetermined frequency to provide indications of at least one of the resistive and reactive characteristics of the formation; an electrode system secured to the support means and encircling the coil system, at least a portion of the electrode system consisting of conductive elements having conductivities and dimensions proportioned so that the resistance of each element is greater than its reactance at the coil system operating frequency thereby to minimize the introduction of erroneous or excessive reactive indications into the coil system; and circuit means for operating the electrode system to provide indications of the resistive characteristics of the formation.

17. In apparatus for investigating earth formations traversed by a borehole, the combination comprising: support means adapted to be moved through a borehole; a coil system secured to the support means for electromagnetic coupling with the earth formations; circuit means for operating the coil system at a predetermined frequency to provide indications of at least one of the resistive and reactive characteristics of the formation; an electrode system secured to the support means and encircling the coil system, at least one of the electrodes individually comprising a closed loop formed by a conductor of relatively small cross-sectional area and a plurality of conductive elements having relatively large surface areas electrically connected to such loop, the conductivity and thickness of the conductive elements being proportioned so that the resistance of each element is greater than its reactance at the coil system operating frequency thereby to minimize the introduction of erroneous or excessive reactive indications into the coil system; and circuit means for operating the electrode system to provide indications of the resistive characteristics of the formation.

18. In apparatus for investigating earth formations traversed by a borehole, the combination comprising: support means adapted to be moved through a borehole; a coil system secured to the support means for electromagnetic coupling with the earth formations; circuit means for operating the coil system at a predetermined frequency to provide indications of at least one of the resistive and reactive characteristics of the formation; an electrode system secured to the support means and encircling the coil system, at least one of the electrodes individually comprising a closed loop formed by a conductor of relatively small cross-sectional area and a plurality of conductive elements having relatively large surface areas electrically connected to such loop, the conductivity and cross-sectional area of the closed loop conductor being proportioned so that the resistance of the loop is greater than its reactance at the coil system operating frequency thereby to minimize the introduction of erroneous or excessive reactive indications into the coil system; and circuit means for operating the electrode system to provide indications of the resistive characteristics of the formation.

19. In apparatus for investigating earth formations traversed by a borehole, the combination comprising: support means adapted to be moved through a borehole; a coil system secured to the support means for electromagnetic coupling with the earth formations; circuit means for operating the coil system at a predetermined frequency to provide indications of the resistive characteristics of the formation; an electrode system secured to the support means and encircling the coil system, one portion of the electrode system consisting of conductive elements having conductivities and dimensions proportioned so that the resistance of each element is greater than its reactance at the coil system operating frequency and another portion of the electrode system consisting of conductive elements having conductivities and dimensions proportioned so that the resistance of each element is less than its reactance at the coil system operating frequency thereby to stabilize the magnitude of any erroneous resistive indications introduced into the coil system with respect to any disturbances, such as a temperature variation, which causes all the element resistances to vary; and circuit means for operating the electrode system to provide further indications of the resistive characteristics of the formation.

20. In borehole investigating apparatus, the combination comprising: elongated support means adapted to be moved through a borehole; a plurality of conductive elements having relatively large exposed surface areas spaced apart around the exterior of the support means to form a discontinuous ring encircling the longitudinal axis thereof; a closed loop formed by an insulated conductor of relatively small cross-sectional area encircling the longitudinal axis of the support means and longitudinally spaced apart from the conductive elements; and a plurality of insulated conductors of relatively small cross-sectional area individually electrically connected to different ones of the conductive elements and extending longitudinally along the support means to the closed loop conductor and electrically connected thereto.

21. In borehole investigating apparatus, the combination comprising: elongated support means having an exterior portion formed of insulating material and adapted to be moved through a borehole; a plurality of conductive elements having relatively large exposed surface areas spaced apart around the exterior of the support means and inlaid in the exterior portion thereof to form a discontinuous ring encircling the longitudinal axis of the support means; a closed loop formed by a conductor of relatively small cross-sectional area imbedded in the exterior portion of the support means encircling the longitudinal axis thereof and longitudinally spaced apart from the conductive elements; and a plurality of conductors of relatively small cross-sectional area imbedded in the exterior portion of the support means and individually electrically connected to different ones of the conductive elements and extending longitudinally within the exterior portion to the closed loop conductor and electrically connected thereto.

22. In apparatus for investigating earth formations traversed by a borehole, the combination comprising: an elongated support means adapted to be moved through a borehole; a system of inductance coils individually secured to the support means encircling the longitudinal axis thereof for electromagnetic coupling with the earth formations; and a system of electrodes for emitting a focussed beam of current into the earth formations secured to the support means adjacent the coil system.

23. In apparatus for investigating earth formations traversed by a borehole, the combination comprising: an elongated support means adapted to be moved through a borehole; a system of inductance coils individually secured to the support means encircling the longitudinal axis thereof for electromagnetic coupling with the earth formations; and a multi-electrode focussed-type system of electrodes for emitting focussed current into the earth formations individually secured to the support means and encircling the coil system.

24. In apparatus for investigating earth formations traversed by a borehole, the combination comprising: an elongated support means adapted to be moved through a borehole; a system of inductance coils individually secured to the support means encircling the longitudinal axis thereof for electromagnetic coupling with the earth formations; and a focussed, shallow-penetration system of electrodes for emitting focussed current into the earth formations secured to the support means and encircling the coil system.

25. In apparatus for investigating earth formations traversed by a borehole, the combination comprising: an elongated support means adapted to be moved through a borehole; a system of inductance coils individually secured to the support means encircling the longitudinal axis thereof for electromagnetic coupling with the earth formations; and a system of electrodes individually secured to the support means encircling the longitudinal axis thereof adjacent the coil system and including a central electrode for emitting survey current into the earth formations and upper and lower electrodes for emitting auxiliary current into the earth formations.

26. In apparatus for investigating earth formations traversed by a borehole, the combination comprising: support means adapted to be moved through a borehole; a coil system secured to the support means for electromagnetic coupling with the earth formations; circuit means coupled to the coil system for energizing the coil system at a first frequency and for providing indications of the coil system response to variations in an electrical characteristic of the formations; an electrode system for emitting a focussed beam of current into the earth formations secured to the support means adjacent the coil system; and circuit means coupled to the electrode system for energizing the electrode system at a second frequency and for providing indications of the electrode system response to variations in an electrical characteristic of the formations.

27. In apparatus for investigating earth formations traversed by a borehole, the combination comprising: support means adapted to be moved through a borehole;

a system of inductance coils secured to the support means for electromagnetic coupling with the earth formations; circuit means for energizing the coil system and for providing indications of the coil system response to variations in an electrical characteristic of the formations; a system of electrodes secured to the support means encircling the coil system and including three spaced-apart current-emitting electrodes; circuit means for energizing the central one of these current-emitting electrodes for emitting survey current from the surface thereof into the adjacent earth formations; circuit means for energizing the other two of the current-emitting electrodes for emitting auxiliary current from the surfaces thereof into the adjacent earth formations; and means coupled to the electrode system for providing indications of an electrical characteristic of the formations.

28. In apparatus for investigating earth formations traversed by a borehole, the combination comprising:
elongated support means having a non-conductive exterior and adapted to be moved through the borehole;
and a borehole investigating electrode secured to the non-conductive exterior and comprising a closed loop of conductor wire encircling the longitudinal axis of the support means and a plurality of conductive plates spaced apart around the exterior of the support means and fastened to the conductor wire in a manner which provides direct electrical connection therewith.

29. In apparatus for investigating earth formations traversed by a borehole, the combination comprising:
elongated support means having an exterior portion formed of insulating material and adapted to be moved through the borehole;
and a borehole investigating electrode secured to the exterior portion of the support means and comprising a closed loop of conductor wire imbedded in the exterior portion of the support means encircling the longitudinal axis thereof and a plurality of conductive plates inlaid in the exterior portion of the support means, fastened to the conductor wire in a manner which provides direct electrical connection therewith, and having exposed surface areas spaced apart around the exterior of the support means.

References Cited in the file of this patent
UNITED STATES PATENTS

| | | |
|---|---|---|
| 2,476,410 | Gardiner | July 19, 1949 |
| 2,712,630 | Doll | July 5, 1955 |
| 2,750,557 | Bricaud | June 12, 1956 |
| 2,787,757 | Piety | Apr. 2, 1957 |
| 2,799,004 | Thompson | July 9, 1957 |
| 2,838,730 | Lebourg | June 10, 1958 |
| 2,870,541 | Mayes | Jan. 27, 1959 |
| 2,871,444 | Piety | Jan. 27, 1959 |
| 2,930,969 | Baker | Mar. 29, 1960 |
| 2,951,982 | Schuster | Sept. 6, 1960 |